US 9,139,193 B2

(12) United States Patent
Bissontz

(10) Patent No.: US 9,139,193 B2
(45) Date of Patent: Sep. 22, 2015

(54) CONTROL SYSTEM FOR PTO EQUIPMENT ON A VEHICLE WITH A HYBRID-ELECTRIC DRIVETRAIN

(75) Inventor: Jay E. Bissontz, Fort Wayne, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 653 days.

(21) Appl. No.: 13/513,226

(22) PCT Filed: Dec. 18, 2009

(86) PCT No.: PCT/US2009/068740
§ 371 (c)(1),
(2), (4) Date: Jun. 29, 2012

(87) PCT Pub. No.: WO2011/075143
PCT Pub. Date: Jun. 23, 2011

(65) Prior Publication Data
US 2012/0265389 A1 Oct. 18, 2012

(51) Int. Cl.
*B60W 20/00* (2006.01)
*B60W 10/30* (2006.01)
(Continued)

(52) U.S. Cl.
CPC .................. *B60W 10/30* (2013.01); *B60K 6/48* (2013.01); *B60K 25/00* (2013.01); *B60W 10/02* (2013.01);
(Continued)

(58) Field of Classification Search
CPC . B60W 30/1888; B60W 10/02; B60W 10/06; B60W 10/08; B60W 10/30; B60K 25/00; B60K 25/06; B60K 6/48
USPC .......................................................... 701/22
See application file for complete search history.

(56) References Cited

U.S. PATENT DOCUMENTS 6,963,796 B2   11/2005   Larson et al.
7,281,595 B2   10/2007   Bissontz
(Continued)

FOREIGN PATENT DOCUMENTS

DE   28 05 594 A1   8/1979
DE   42 04 384 A1   8/1993
WO   2006/027656 A1   3/2006

OTHER PUBLICATIONS

Visteon, Operating Instructions for the Auxiliary Idle Control Module, 1998, Visteon Automotive Systems.*
(Continued)

*Primary Examiner* — John Q Nguyen
*Assistant Examiner* — Nadeem Odeh
(74) *Attorney, Agent, or Firm* — Jeffrey P. Calfa; Mark C. Bach

(57) ABSTRACT

A power take off system for a hybrid-electric vehicle comprises an internal combustion engine, a hybrid-electric motor and generator, a power take off mechanism, a hybrid control module, and an engaging mechanism. The hybrid-electric motor and generator couples to the internal combustion engine. The power take off mechanism couples to the internal combustion engine and the hybrid-electric motor and generator. The power take off mechanism receives torque from at least one of the internal combustion engine and the hybrid-electric motor and generator. The hybrid control module is disposed in electrical communication with an electronic system controller. The hybrid control module generates output signals for controlling the internal combustion engine. The engaging mechanism is disposed in electrical communication with the electronic system controller. The engaging mechanism has a first mode and a second mode. The power take off mechanism is decoupled from the internal combustion engine and the hybrid-electric motor and generator in response to an output signal generated by the electronic system controller.

16 Claims, 3 Drawing Sheets

(51) Int. Cl.

| | |
|---|---|
| *B60K 6/48* | (2007.10) |
| *B60K 25/00* | (2006.01) |
| *B60W 10/02* | (2006.01) |
| *B60W 10/06* | (2006.01) |
| *B60W 10/08* | (2006.01) |
| *B60W 30/188* | (2012.01) |
| *E02F 9/20* | (2006.01) |
| *E02F 9/22* | (2006.01) |

(52) U.S. Cl.
CPC ............... *B60W 10/06* (2013.01); *B60W 10/08* (2013.01); *B60W 30/1888* (2013.01); *E02F 9/2075* (2013.01); *E02F 9/2242* (2013.01); *B60W 20/00* (2013.01); *B60Y 2200/41* (2013.01); *Y02T 10/6221* (2013.01); *Y02T 10/6286* (2013.01)

(56) References Cited

U.S. PATENT DOCUMENTS

| | | |
|---|---|---|
| 2005/0036894 A1 | 2/2005 | Oguri |
| 2008/0177434 A1 | 7/2008 | Moran |
| 2009/0095549 A1 * | 4/2009 | Dalum et al. ............ 180/65.265 |

OTHER PUBLICATIONS

Examination Report for corresponding Swedish Application.

* cited by examiner

CONTROL SYSTEM FOR PTO EQUIPMENT ON A VEHICLE WITH A HYBRID-ELECTRIC DRIVETRAIN

TECHNICAL FIELD

The present disclosure relates to a hydraulic load control system for power take off ("PTO") equipment on a vehicle with a hybrid-electric drivetrain, and more particularly to a system and method for transitioning between internal combustion engine powered operation of the PTO and hybrid-electric drivetrain powered operation of the PTO that supplies power for the hydraulic load.

BACKGROUND

Many vehicles now utilize hybrid-electric drivetrains in order to increase the efficiency of the vehicle. A hybrid-electric drivetrain typically involves an internal combustion engine that operates a generator that produces electrical power that may be used to drive electric motors used to move the vehicle. The electric motors may be used to provide power to wheels of the vehicle to move the vehicle, or the electric motors may be used to supplement power provided to the wheels by the internal combustion engine and a transmission. In certain operational situations, the electric motors may supply all of the power to the wheels, such as under low speed operations. In addition to providing power to move the vehicle, the hybrid-electric drivetrain may be used to power a PTO of the vehicle that in turn powers PTO driven accessories. A hybrid-electric drivetrain may solely power the PTO of the vehicle when the PTO is operating a PTO driven accessory adapted to only be utilized by a stopped vehicle, such as lift attachment, or a digging attachment. In some situations, the hybrid-electric drivetrain is not capable of providing sufficient power to the PTO, and thus, the PTO needs to be powered by the internal combustion engine. In other situations, batteries of the hybrid-electric drivetrain may need to be recharged. In both of these situations, if the PTO is being powered by the hybrid-electric drivetrain, the PTO must be stopped, such that the internal combustion engine may be started to deliver power to the PTO, or to recharge batteries of the hybrid-electric drivetrain. Therefore, a need exists for a system and method that is capable of shutting down a PTO that is being driven by a hybrid-electric drivetrain, such that an internal combustion engine may be started to power the PTO, or to recharge batteries of the hybrid-electric drivetrain.

SUMMARY

According to one embodiment, a power take off system for a hybrid-electric vehicle comprises an internal combustion engine, a hybrid-electric motor and generator, a power take off mechanism, a hybrid control module, and an engaging mechanism. The hybrid-electric motor and generator couples to the internal combustion engine. The power take off mechanism mechanically couples to the internal combustion engine and the hybrid-electric motor and generator. The power take off mechanism receives torque from at least one of the internal combustion engine and the hybrid-electric motor and generator. The hybrid control module is disposed in electrical communication with an electronic system controller. The hybrid control module is provided to generate output signals for controlling the internal combustion engine. The engaging mechanism is disposed in electrical communication with the electronic system controller. The engaging mechanism has a first mode and a second mode. Wherein in the first mode the power take off mechanism is decoupled from the internal combustion engine and the hybrid-electric motor and generator in response to an output signal generated by the electronic system controller.

According to one process, a method of operating a power take off system for a hybrid electric vehicle having an internal combustion engine and a hybrid-electric motor and generator is provided. An output signal is generated from a user input switch to supply torque to a power take off mechanism from the internal combustion engine. An engaging mechanism opens in response to the output signal from the user input switch. A power take off mechanism disengages from a hybrid-electric motor and generator in response to the opening the engaging mechanism. An internal combustion engine is started using the hybrid-electric motor and generator. The engaging mechanism closes after starting the internal combustion engine. Torque is provided to the power take off mechanism from the internal combustion engine in response to closing the engaging mechanism.

According to another process, a method of operating a power take off system for a hybrid-electric vehicle having an internal combustion engine and a hybrid-electric motor and generator is provided. Load of a power take off mechanism is monitored with a hybrid control module while the power take off is powered by a hybrid-electric motor and generator. An engaging mechanism opens in response to monitoring load of the power take off mechanism when the load surpasses a predetermined threshold. A power take off mechanism disengages from a hybrid-electric motor and generator in response to the opening the engaging mechanism. An internal combustion engine is started using the hybrid-electric motor and generator. The engaging mechanism closes after starting the internal combustion engine. Torque is provided to the power take off mechanism from the internal combustion engine in response to closing the engaging mechanism.

DETAILED DESCRIPTION

Figure 1:
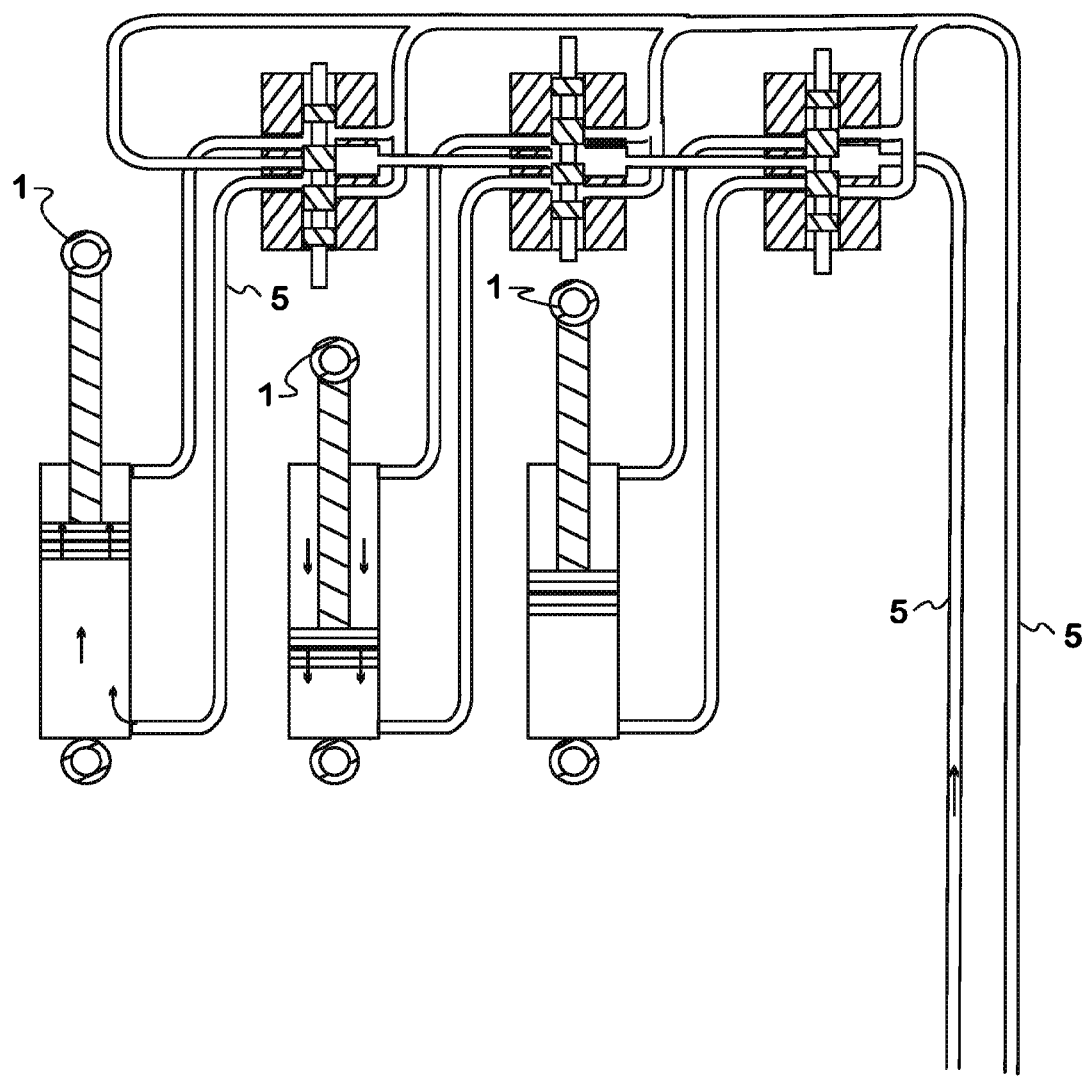
FIGS. 1, 2 and 3 comprise a schematic view of a vehicle having a hybrid-electric drivetrain with a PTO driven hydraulic system including a combination valve in an open position.
Figure 2:
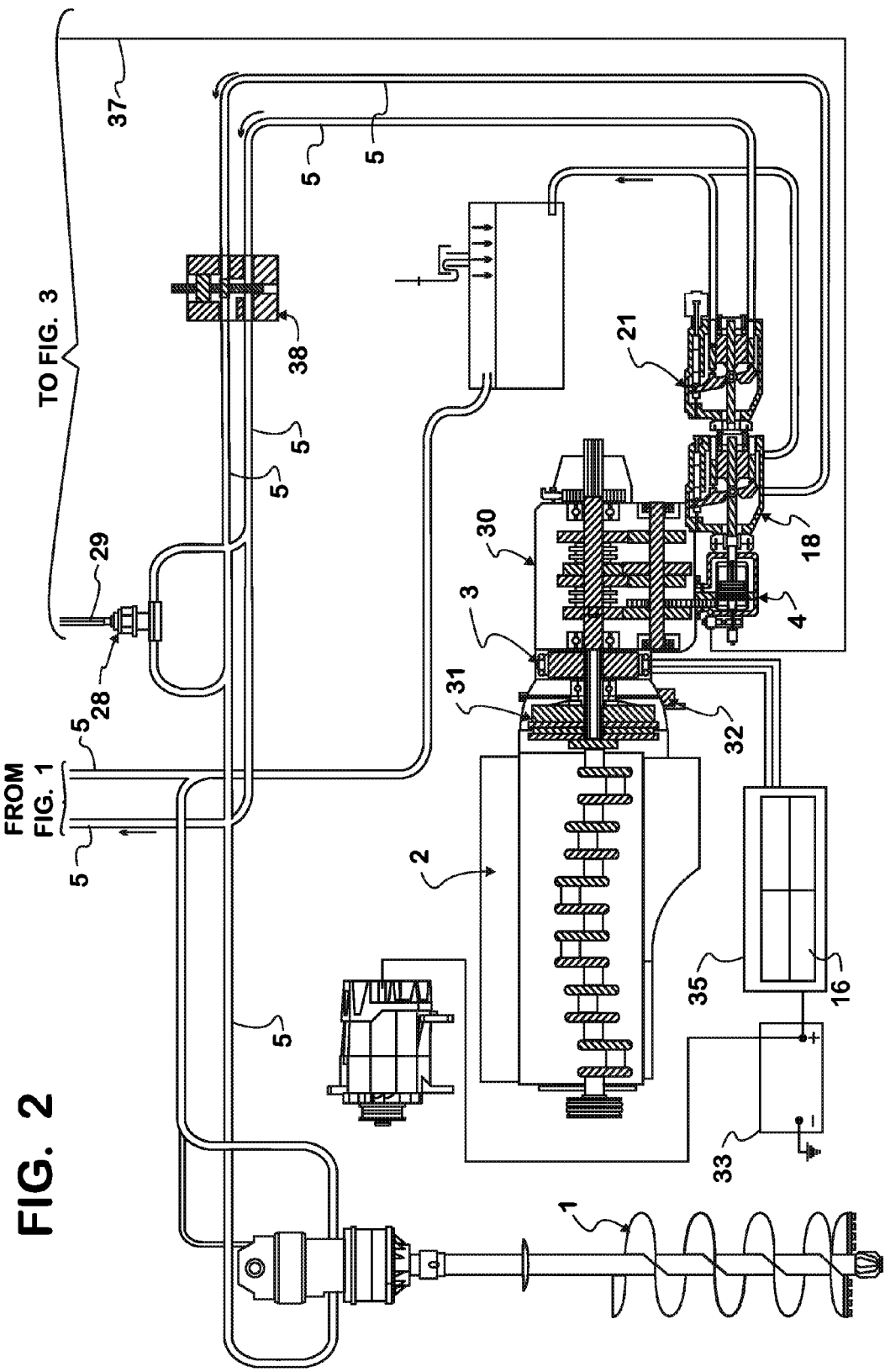
Figure 3:
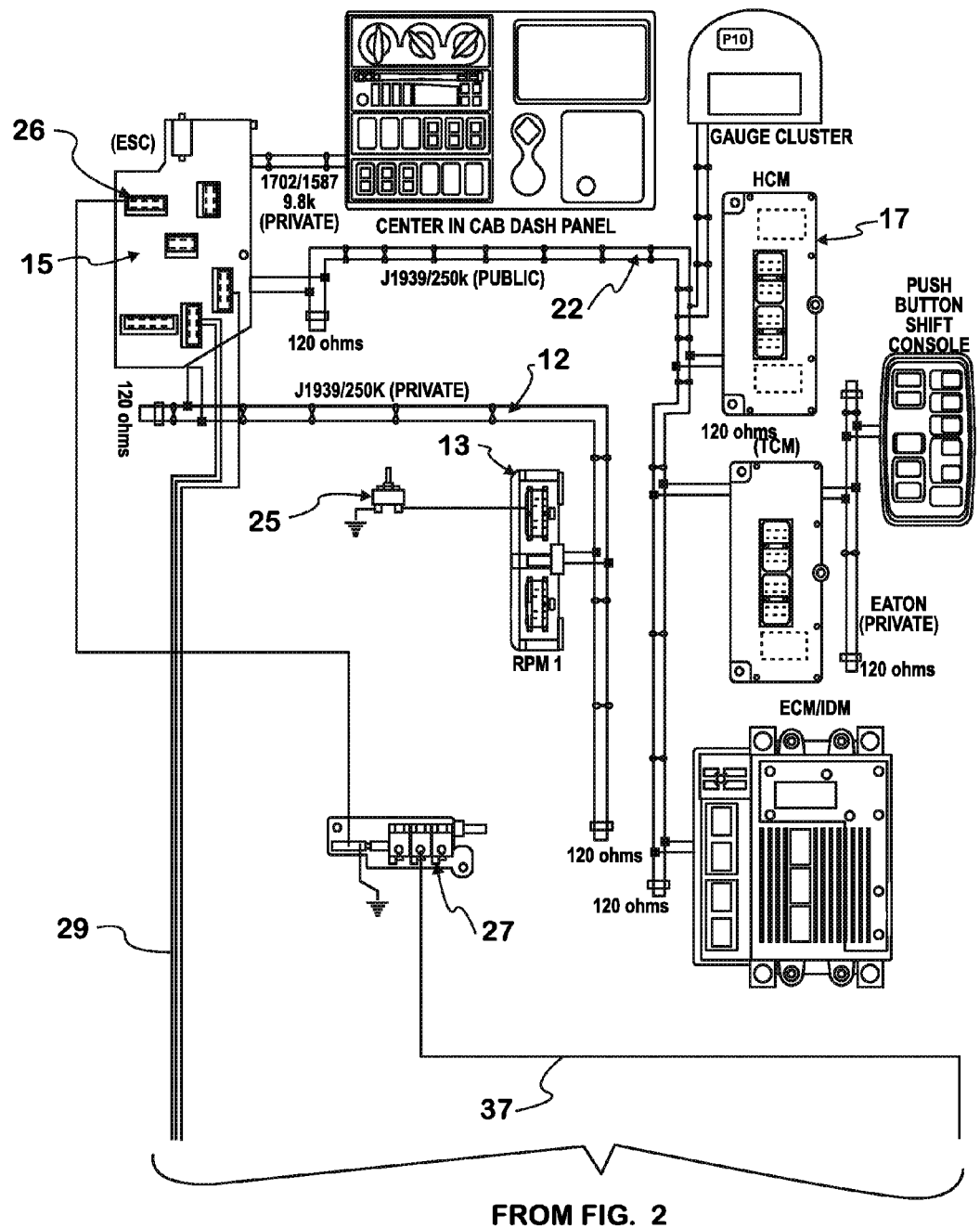

FIGS. 1, 2 and 3 show a schematic view of a vehicle having a vehicle mounted PTO driven accessory 1, an internal combustion engine 2, a hybrid-electric motor and generator 3, and a PTO mechanism 4. Additional information relating to vehicles having PTO driven accessories as well as a hybrid-electric powertrain may be found in U.S. Pat. No. 7,281,595, incorporated by reference herein in its entirety. The internal combustion engine 2 may be a diesel engine. As shown in FIGS. 1, 2 and 3 the PTO driven accessory 1 is a hydraulic digging attachment adapted to be used when the vehicle is stationary, but a variety of other PTO driven accessories may be used. As the PTO driven accessory 1 shown in FIGS. 1, 2 and 3 is adapted to be used when the vehicle is stationary, the hybrid-electric motor and generator 3 may power the PTO mechanism 4 when the vehicle is stationary. However, if the PTO driven accessory 1 will be used in manner an operator expects to require a large amount of power, the operator may initiate a transition from the hybrid-electric motor and generator 3 powering the PTO mechanism 4, to the internal combustion engine 2 powering the PTO mechanism 4 after starting the internal combustion engine 2. Therefore the PTO mechanism 4 is mechanically coupled to output of both the internal combustion engine 2, and the hybrid-electric motor and generator 3. That is the PTO mechanism 4 is adapted to receive torque from one or both of the internal combustion engine 2, or the hybrid-electric motor and generator 3, such as through shafts, gears, belts, or the like.

An operator may receive an alert that the hybrid-electric motor and generator 3 is nearing the maximum power output, the operator may observe that a power electronics system 35 that control the hybrid-electric motor and generator 3 may not be able to supply sufficient power to the PTO mechanism, or the operator may simply know from experience that the PTO driven accessory 1 will require hybrid-electric motor and generator are unlikely to be able to provide sufficient power to the PTO mechanism 4 causing the operator to activate switch 25 to generates a signal sent to a controller area network data link module, such as a remote power module 13. It is to be understood that when "signal" is mentioned herein, there exists appropriate conductors for conveying the signal. The remote power module 13 in turn generates a signal transmitted over a first data link 12 to an electronic system controller ("ESC") 15.

Figure 4:
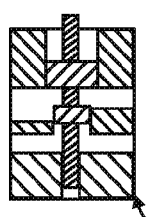
FIG. 4 is a sectional view of a combination valve in a closed position.

The ESC 15 transmits a signal over a second data link 22 to a hybrid control module ("HCM") 17. The signal from the ESC 15 to the HCM 17 alerts the HCM 17 that the PTO mechanism 4 is about to disengage based upon the signal from the switch 25, and that the internal combustion engine 2 will be started. The ESC 15 additionally deactivates an output signal 26 that controls an engaging mechanism 27, such as a solenoid valve, used to engage and disengage the PTO mechanism 4 via signal 37. The engaging mechanism 27 has a first mode that decouples, or disengages, the PTO mechanism 4 from the internal combustion engine 2 and the hybrid-electric motor and generator 3, while the second mode couples, or engages the PTO mechanism 4 to the internal combustion engine 2 and the hybrid-electric motor and generator 3. The disengagement of the PTO mechanism 4 disengages a first hydraulic pump 18 and a second hydraulic pump 21 that are powered by the PTO mechanism 4. Once the PTO mechanism 4 has been disengaged, the ESC 15 monitors an transducer 28 that generates a transducer output signal 29 such that the ESC 15 may monitor the load within a hydraulic system 5. The illustrated embodiment of the hydraulic system 5 includes a combination valve 38 shown in an open position in FIG. 3 and in a closed position in FIG. 4.

Once the ESC 15 determines that the load within the hydraulic system 5 is sufficiently low, ESC 15 transmits a signal to the HCM 17 instructing the HCM 17 to disengage a transmission 30 by using a clutch 31 via an electric clutch actuator 32. Once the clutch 31 has disengaged the transmission 30, the hybrid-electric motor and generator 3 acts as a starter for the internal combustion engine 2, and initiate operation of the internal combustion engine 2.

Once the internal combustion engine 2 is operating properly, the ESC 15 again monitors the transducer output signal 29 of the transducer 28 to determine whether the PTO driven accessory 1 is trying to be being used. The ESC 15 reactivates the output signal 26 such that the engaging mechanism 27 reengages the PTO mechanism 4. The PTO mechanism 4 is powered by the internal combustion engine 2, as opposed to the hybrid-electric motor and generator 3. The PTO mechanism 4 reengages the first hydraulic pump 18 and the second hydraulic pump 21, allowing the PTO driven accessory 1 to be used to perform a task requiring more power than the hybrid-electric motor and generator 3 may deliver.

The ESC 15 continues to monitor the output signal 29 of the transducer 28 and if the output signal 29 indicates that the PTO driven accessory 1 is no longer being used, the ESC 15 will transmit a signal to the HCM 17 to shutdown the internal combustion engine 2.

In addition to shutting down the internal combustion engine 2 when the PTO driven accessory is no longer being used, it is additionally contemplated that the internal combustion engine 2 may be shutdown when high voltage batteries 16 of the power electronics system 35 are fully charged, chassis batteries 33 are fully charged, or the HCM 17 communicates over the second data link 22 to the ESC 15 that the loads generated by the PTO driven accessory 1 are small enough that the hybrid-electric motor and generator 3 can deliver sufficient power to the PTO mechanism 4 to support the PTO driven accessory 1.

In addition to a user initiated method of transitioning from the hybrid-electric motor and generator 3 powering the PTO mechanism 4, to the internal combustion engine 2 powering the PTO mechanism 4, an automatic method of transitioning from the hybrid-electric motor and generator 3 powering the PTO mechanism 4, to the internal combustion engine 2 powering the PTO mechanism 4 is provided.

The automatic method transitioning of from the hybrid-electric motor and generator 3 powering the PTO mechanism 4, to the internal combustion engine 2 powering the PTO mechanism 4 is similar to the user initiated method. PTO mechanism 4 is receiving power form the hybrid-electric motor and generator 3 in order to power a PTO driven accessory 1. The PTO driven accessory 1 is an accessory adapted to be used while the vehicle is not in motion, such that the internal combustion engine 2 need not always be utilized.

The HCM 17 monitors the power electronics system 35 as well of the loads imparted by the PTO driven accessory 1. When the HCM 17 detects that the power electronics system 35 for the hybrid-electric motor and generator 3 is not capable of providing sufficient power for the PTO mechanism 4, the HCM 17 generates a signal to sent to the ESC 15 over the second data link 22.

In response to the signal from the HCM, the ESC 15 will reply to the HCM 17 to alert the HCM 17 that the PTO mechanism 4 is about to disengage based upon the signal from the HCM 17, and that the internal combustion engine 2 will be started. The ESC 15 will also deactivate the output signal 26 that controls the engaging mechanism 27 used to engage and disengage the PTO mechanism 4 in response to the signal from the HCM 17. The disengagement of the PTO mechanism 4 disengages a first hydraulic pump 18 and a second hydraulic pump 21 that are powered by the PTO mechanism 4. Once the PTO mechanism 4 has been disengaged, the ESC 15 monitors an transducer 28 that generates a transducer output signal 29 such that the ESC 15 may monitor the load within a hydraulic system 5.

Once the ESC 15 determines that the load within the hydraulic system 5 is sufficiently low, ESC 15 transmits a signal to the HCM 17 instructing the HCM 17 to disengage a transmission 30 by using a clutch 31 via an electric clutch actuator 32. Once the clutch 31 has disengaged the transmission 30, the hybrid-electric motor and generator 3 acts as a starter for the internal combustion engine 2, and initiate operation of the internal combustion engine 2.

Once the internal combustion engine 2 is operating properly, the ESC 15 again monitors the transducer output signal 29 of the transducer 28 to determine whether the PTO driven accessory 1 is trying to be being used. The ESC 15 reactivates the output signal 26 such that the engaging mechanism 27 reengages the PTO mechanism 4. The PTO mechanism 4 is powered by the internal combustion engine 2, as opposed to the hybrid-electric motor and generator 3. The PTO mechanism 4 reengages the first hydraulic pump 18 and the second hydraulic pump 21, allowing the PTO driven accessory 1 to be used to perform a task requiring more power than the hybrid-electric motor and generator 3 may deliver.

The ESC 15 continues to monitor the output signal 29 of the transducer 28 and if the output signal 29 indicates that the PTO driven accessory 1 is no longer being used, the ESC 15 will transmit a signal to the HCM 17 to shutdown the internal combustion engine 2.

In addition to shutting down the internal combustion engine 2 when the PTO driven accessory is no longer being used, it is additionally contemplated that the internal combustion engine 2 may be shutdown when high voltage batteries 16 of the power electronics system 35 are fully charged, chassis batteries 33 are fully charged, or the HCM 17 communicates over the second data link 22 to the ESC 15 that the loads generated by the PTO driven accessory 1 are small enough that the hybrid-electric motor and generator 3 can deliver sufficient power to the PTO mechanism 4 to support the PTO driven accessory 1.

Thus, the use of the hybrid-electric motor and generator 3 allows for the use of the PTO driven accessory 1, without having to constantly run the internal combustion engine 2 when the hybrid-electric motor and generator 3 powers the PTO mechanism 4, reducing the fuel consumption of the vehicle, while allowing the internal combustion engine 2 to power the PTO mechanism 4 when higher power levels are required, or the power electronics system 35 lack sufficient charge to operate the hybrid-electric motor and generator 3. Thus, the vehicle may save fuel while using the PTO driven accessory 1 for light duty tasks, but still maintains the capability to perform heavy duty tasks utilizing the internal combustion engine 2.

What is claimed is:

1. A power take off system for a hybrid-electric vehicle comprising:
    an internal combustion engine;
    a hybrid-electric motor and generator coupled to the internal combustion engine;
    a power take off mechanism mechanically coupled to the internal combustion engine and the hybrid-electric motor and generator, the power take off mechanism receiving torque from at least one of the internal combustion engine and the hybrid-electric motor and generator;
    a hybrid control module disposed in electrical communication with an electronic system controller, the hybrid control module provided for generating output signals for controlling the internal combustion engine;
    an engaging mechanism, wherein the engaging mechanism is a solenoid valve, the engaging mechanism disposed in electrical communication with the electronic system controller, the engaging mechanism having a first mode and a second mode, wherein when the engaging mechanism is in the first mode, the power take off mechanism is decoupled from the internal combustion engine and the hybrid-electric motor and generator in response to an output signal generated by the electronic system controller, and wherein in the second mode, the power take off mechanism is coupled to the internal combustion engine and to the hybrid-electric motor and generator in response to said output signal generated by the electronic system controller;
    a power take off driven accessory operatively connected with and driven by the power take off mechanism;
    a transducer disposed between the power take off mechanism and the power take off driven accessory, the transducer generating an output signal indicative of a load of the power take off driven accessory;
    the hybrid control module being operable to detect that the hybrid-electric motor and generator is not capable of providing sufficient power for the power take off mechanism due to the load of the power take off driven accessory exceeding the maximum output of the hybrid-electric motor and generator, and to subsequently transition the engaging mechanism from the second mode to the first mode, and then to start the internal combustion engine;
    the hybrid control module being operable to transition the engaging mechanism from the first mode to the second mode once the internal combustion engine is started and only when the transducer generated output signal indicates that a load is being demanded by the power take off driven accessory.

2. The power take off system for a hybrid-electric vehicle of claim 1 wherein:
    a transmission is coupled to the internal combustion engine and to the hybrid-electric motor and generator by way of a clutch, the clutch being operable between a coupled mode and a decoupled mode, the electronic system controller being further operable to decouple the transmission from the internal combustion engine and from the hybrid-electric motor upon the hybrid control module detecting that the hybrid-electric motor and generator is not capable of providing sufficient power for the power take off mechanism, only if the load of the power take off driven accessory is below a first threshold.

3. The power take off system for a hybrid-electric vehicle of claim 1 wherein the output signal of the transducer is sent to the electronic system controller.

4. The power take off system for a hybrid-electric vehicle of claim 1 further comprising:
    an operator switch, the operator switch generates an output signal adapted to control operation of the internal combustion engine, such that only the internal combustion engine provides torque to the power take off mechanism, the operator switch overriding the hybrid control module detection that the hybrid-electric motor and generator is capable of providing sufficient power for the power take off mechanism, when such operator switch is generating its output signal.

5. The power take off system for a hybrid-electric vehicle of claim 1 wherein the hybrid control mechanism generates an output signal adapted to control operation of the internal combustion engine, such that only the internal combustion engine provides torque to the power take off mechanism.

6. A method of operating a power take off system for a hybrid electric vehicle having an internal combustion engine and a hybrid-electric motor and generator, the method comprising:
    providing a power take off mechanism mechanically coupled to the internal combustion engine and the hybrid-electric motor and generator, the power take off mechanism receiving torque from at least one of the internal combustion engine and the hybrid-electric motor and generator;
    providing a power take off driven accessory operatively connected with and driven by the power take off mechanism;
    providing a transducer disposed between the power take off mechanism and the power take off driven accessory, the transducer generating an output signal indicative of a load of the power take off driven accessory;

providing an alert that the hybrid-electric motor and generator is nearing its maximum output based on the output signal of the transducer;

responding to an output signal from a user input switch to supply torque to a power take off mechanism from the internal combustion engine;

opening an engaging mechanism in response to the output signal from the user input switch, wherein the engaging mechanism is a solenoid valve;

disengaging a power take off mechanism from a hybrid-electric motor and generator in response to opening the engaging mechanism;

starting the internal combustion engine using the hybrid-electric motor and generator;

closing the engaging mechanism after starting the internal combustion engine; and providing torque to the power take off mechanism from the internal combustion engine in response to closing the engaging mechanism.

7. The method of claim 6 further comprising:
monitoring load of the power take off mechanism after disengaging the power take off mechanism prior to starting the internal combustion engine.

8. The method of claim 7, wherein starting of the internal combustion engine is performed only after the load of the power take off mechanism is below a predetermined limit.

9. The method of claim 6 further comprising:
monitoring load of the power take off mechanism before closing the engaging mechanism.

10. The method of claim 6 further comprising:
closing a clutch connecting the internal combustion engine to the hybrid electric motor and generator prior to starting the internal combustion engine.

11. A method of operating a power take off system for a hybrid-electric vehicle having an internal combustion engine and a hybrid-electric motor and generator, the method comprising:

monitoring load of a power take off mechanism with a hybrid control module while the power take off system is powered by a hybrid-electric motor and generator;

opening an engaging mechanism in response to monitored load of the power take off mechanism exceeding the maximum output of the hybrid-electric motor and generator, wherein the engaging mechanism is a solenoid valve;

disengaging a power take off mechanism from a hybrid-electric motor and generator in response to opening the engaging mechanism;

starting an internal combustion engine using the hybrid-electric motor and generator;

closing the engaging mechanism after starting the internal combustion engine; and providing torque to the power take off mechanism from the internal combustion engine in response to closing the engaging mechanism.

12. The method of claim 11 further comprising:
monitoring load of a power take off mechanism with a hybrid control module while the power take off mechanism is powered by the internal combustion engine;

opening the engaging mechanism in response to monitored load of the power take off mechanism falling below a predetermined threshold;

disengaging the power take off mechanism from the internal combustion engine in response to opening the engaging mechanism;

shutting down the internal combustion engine;

closing the engaging mechanism after shutting down the internal combustion engine; and providing torque to the power take off mechanism from the hybrid-electric motor and generator in response to closing the engaging mechanism.

13. The method of claim 11 further comprising:
monitoring load of the power take off mechanism after disengaging the power take off mechanism prior to starting the internal combustion engine.

14. The method of claim 13, wherein starting of the internal combustion engine is performed only after the load of the power take off mechanism is below a predetermined limit.

15. The method of claim 11 further comprising:
monitoring load of the power take off mechanism before closing the engaging mechanism.

16. The method of claim 11 further comprising:
closing a clutch connecting the internal combustion engine to the hybrid electric motor and generator prior to starting the internal combustion engine.

* * * * *